United States Patent
Zhang et al.

(10) Patent No.: US 11,782,086 B2
(45) Date of Patent: Oct. 10, 2023

(54) METHOD FOR OBTAINING BOARD PARAMETERS OF PRINTED CIRCUIT BOARD

(71) Applicant: Montage Electronics (Shanghai) Co., Ltd., Shanghai (CN)

(72) Inventors: Wenjuan Zhang, Shanghai (CN); Yu Zhong, Shanghai (CN); Gang Yan, Shanghai (CN); Zhongyuan Chang, Shanghai (CN)

(73) Assignee: Montage Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/860,112

(22) Filed: Jul. 8, 2022

(65) Prior Publication Data
US 2023/0016096 A1   Jan. 19, 2023

(30) Foreign Application Priority Data

Jul. 15, 2021 (CN) .......................... 202110802152.3

(51) Int. Cl.
*G01R 1/38* (2006.01)
*G01R 31/28* (2006.01)

(52) U.S. Cl.
CPC ................. *G01R 31/2813* (2013.01)

(58) Field of Classification Search
CPC ............ G01R 31/2801; G01R 31/2812; G01R 31/2813; G01R 31/2815; G01R 31/2818; G06F 30/20; G06F 30/39
See application file for complete search history.

(56) References Cited

U.S. PATENT DOCUMENTS

| | | | | |
|---|---|---|---|---|
| 6,753,679 B1* | 6/2004 | Kwong | ................. | H05K 1/167 324/763.01 |
| 2007/0244684 A1* | 10/2007 | Murugan | ............. | H05K 3/0005 703/14 |
| 2009/0322350 A1* | 12/2009 | Aygun | ................. | H05K 1/0268 324/642 |
| 2011/0025435 A1* | 2/2011 | Gorbachov | ........... | G06F 30/367 716/102 |

FOREIGN PATENT DOCUMENTS

| CN | 106844924 | * | 2/2021 |
| JP | 2017009399 | * | 1/2017 |

* cited by examiner

*Primary Examiner* — Thang X Le (57) ABSTRACT

A method for obtaining board parameters of a printed circuit board, including the following steps: obtaining parameter information of a stripline on the printed circuit board; obtaining physical parameters of the stripline based on the parameter information of the stripline and a predetermined electromagnetic simulation application; calculating required board parameters of the printed circuit board based on the parameter information and the physical parameters of the stripline. In the present disclosure, the physical parameters of the stripline are obtained based on the physical nature of the stripline on the printed circuit board, and there is no need for fitting or adopting a hypothetical model in order to obtain board parameters corresponding to each frequency point of the stripline; the present disclosure is simple and straightforward during operation, and the obtained board parameters of the printed circuit board are highly accurate.

9 Claims, 5 Drawing Sheets

- S110: Obtaining parameter information of a stripline on the printed circuit board
- S120: Obtaining physical parameters of the stripline based on the parameter information of the stripline and a predetermined electromagnetic simulation application
- S130: Calculating the board parameters of the printed circuit board based on the parameter information and the physical parameters of the stripline

METHOD FOR OBTAINING BOARD PARAMETERS OF PRINTED CIRCUIT BOARD

CROSS REFERENCE TO RELATED APPLICATION

The present application claims the benefit of priority to Chinese Patent Application No. CN 202110802152.3, entitled "Method for obtaining board parameters of printed circuit board", filed with CNIPA on Jul. 15, 2021, the disclosure of which is incorporated herein by reference in its entirety for all purposes.

FIELD OF TECHNOLOGY

The present disclosure relates to the technical field of electronic circuits, in particular to the technical field of printed circuit boards, and specifically to a method for obtaining board parameters of a printed circuit board.

BACKGROUND

Printed circuit boards (PCB) are important electronic components. They support electronic elements, they are carriers for electrical interconnections among electronic elements, and they are an important part of circuit design. For high-speed PCB design, PCB performance simulation is required at the development stage. In order to improve the accuracy of simulation at the development stage, accurate PCB board parameters including relative dielectric constant Dk and loss factor Df need to be known.

Usually, PCB manufacturers provide the relative dielectric constant Dk and the loss factor Df at a certain frequency for simulation. However, the relative dielectric constants Dk and loss factors Df are frequency-dependent, and they also vary with different application scenarios. Therefore, the relative dielectric constant Dk and loss factor Df provided by the PCB manufacturers deviate from the actual parameters. In addition, methods of obtaining relative dielectric constant Dk and loss factor Df of PCB commonly used in the prior art include assuming a specific model or fitting parameters. However, the actual situation does not necessarily conform to the assumed specific model, and the fitted results may also be inaccurate.

SUMMARY

The present disclosure provides a method for obtaining board parameters of a printed circuit board, including the following steps: obtaining parameter information of a stripline on the printed circuit board; obtaining physical parameters of the stripline based on the parameter information of the stripline and a predetermined electromagnetic simulation application; calculating required board parameters of the printed circuit board based on the parameter information and the physical parameters of the stripline.

In an embodiment of the present disclosure, obtaining the parameter information of the stripline comprises: obtaining a transmission constant of the stripline.

In an embodiment of the present disclosure, obtaining the parameter information of the stripline comprises: obtaining a DC resistance of the stripline; and obtaining dimensions of a cross-section of the stripline.

In an embodiment of the present disclosure, obtaining the parameter information of the stripline further comprises: obtaining electrical conductivity of the stripline based on the DC resistance of the stripline and the dimensions of the cross-section of the stripline.

In an embodiment of the present disclosure, obtaining physical parameters of the stripline based on the parameter information of the stripline and the predetermined electromagnetic simulation application comprises: configuring an input angular frequency and transmission medium; constructing a simulated stripline in the predetermined electromagnetic simulation application based on the dimensions of the cross-section of the stripline, a conductivity of the stripline, the input angular frequency, and the transmission medium; and generating the physical parameters including a series resistance, a series inductance, and an external inductance of the stripline based on the simulated stripline.

In an embodiment of the present disclosure, the transmission medium is air.

In an embodiment of the present disclosure, calculating the required board parameters of the printed circuit board based on the parameter information and the physical parameters of the stripline comprises: obtaining a first parameter and a second parameter of the board parameters of the printed circuit board based on the transmission constant, the series resistance, the series inductance of the stripline calculated by means of a first calculation formula; and calculating the board parameters of the printed circuit board based on the first parameter, the second parameter, and the external inductance.

In an embodiment of the present disclosure, the first calculation formula is given by:

$$G + j\omega C = \frac{\gamma^2}{R + j\omega L},$$

wherein $\gamma$ is the transmission constant of the stripline and is a complex number, R is the series resistance, L is the series inductance, G is the first parameter, the first parameter is a parallel conductance, C is the second parameter, the second parameter is a parallel capacitance, j is the imaginary part, $\omega$ is the input angular frequency.

In an embodiment of the present disclosure, the board parameters of the printed circuit board comprise a relative dielectric constant, and the relative dielectric constant is calculated by the following formula:

$$Dk = \frac{L_{ext}C}{\mu_0 \varepsilon_0},$$

wherein Dk is the relative dielectric constant, $L_{ext}$ is the external inductance, C is the second parameter, with the second parameter being the parallel capacitance, $\mu_0$ is the vacuum magnetic permeability, and $\varepsilon_0$ is the vacuum conductivity.

In an embodiment of the present disclosure, the board parameters of the printed circuit board comprises a loss factor, and the loss factor is given by:

$$Df = \frac{G}{\omega C},$$

wherein Df is the loss factor, G is the first parameter, the first parameter is the parallel conductance, C is the second parameter, the second parameter is the parallel capacitance, and ω is the input angular frequency.

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It is to be noted that the following embodiments and the features in the embodiments may be combined with each other without conflict.

It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout can also be more complicated.

Some aspects of the present disclosure solve the problem in the prior art that board parameters of a printed circuit board cannot be accurately and effectively obtained.

The following will elaborate the principle and implementation of a method of obtaining board parameters of a printed circuit board so that a person skilled in the art can understand the method without creative labor.

Figure 1:
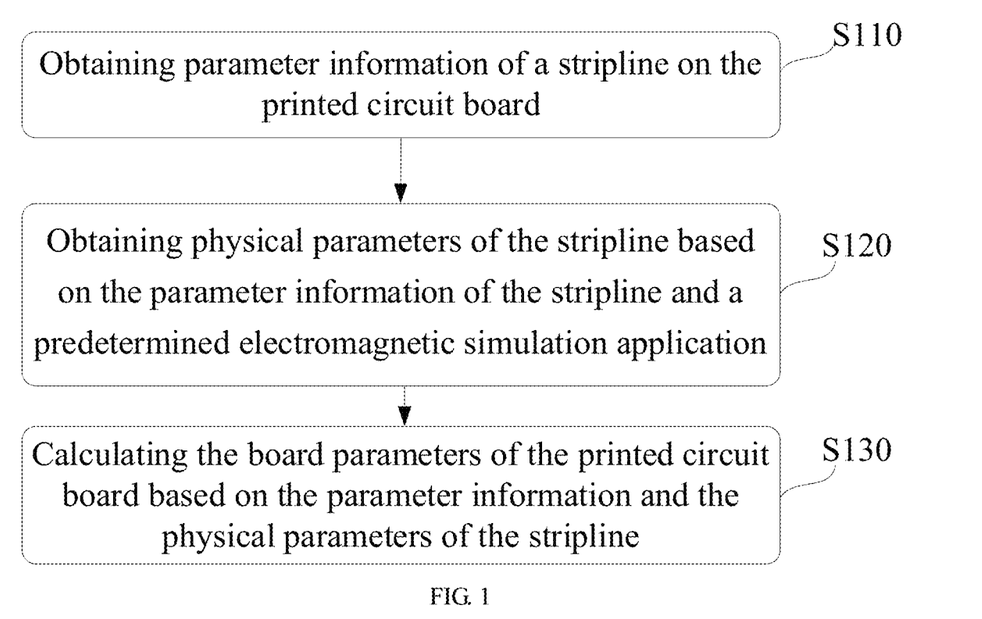
FIG. 1 shows a general flowchart illustrating a method of obtaining board parameters of a printed circuit board according to one embodiment of the present disclosure.

The present disclosure provides a method for obtaining board parameters of a printed circuit board, and FIG. 1 shows a general flowchart illustrating a method of obtaining board parameters of a printed circuit board according to one embodiment of the present disclosure; as shown in FIG. 1, the method for obtaining board parameters of a printed circuit board comprises the following steps:

step S110, obtaining parameter information of a stripline on the printed circuit board;

step S120, obtaining physical parameters of the stripline based on the parameter information of the stripline and a predetermined electromagnetic simulation application; and step S130, calculating the board parameters of the printed circuit board based on the parameter information and the physical parameters of the stripline.

The method is described in further detail below.

Step S110, obtaining parameter information of a stripline on the printed circuit board.

The parameter information of the stripline on the printed circuit board includes, but is not limited to, a transmission constant of the stripline, a DC resistance of the stripline, dimensions of a cross-section of the stripline, and a conductivity of the stripline.

Either the transmission constant of the stripline or the DC resistance of the stripline can be obtained first, and after obtaining the transmission constant of the stripline and the DC resistance of the stripline, the dimensions of the cross-section of the stripline are obtained.

Figure 2:
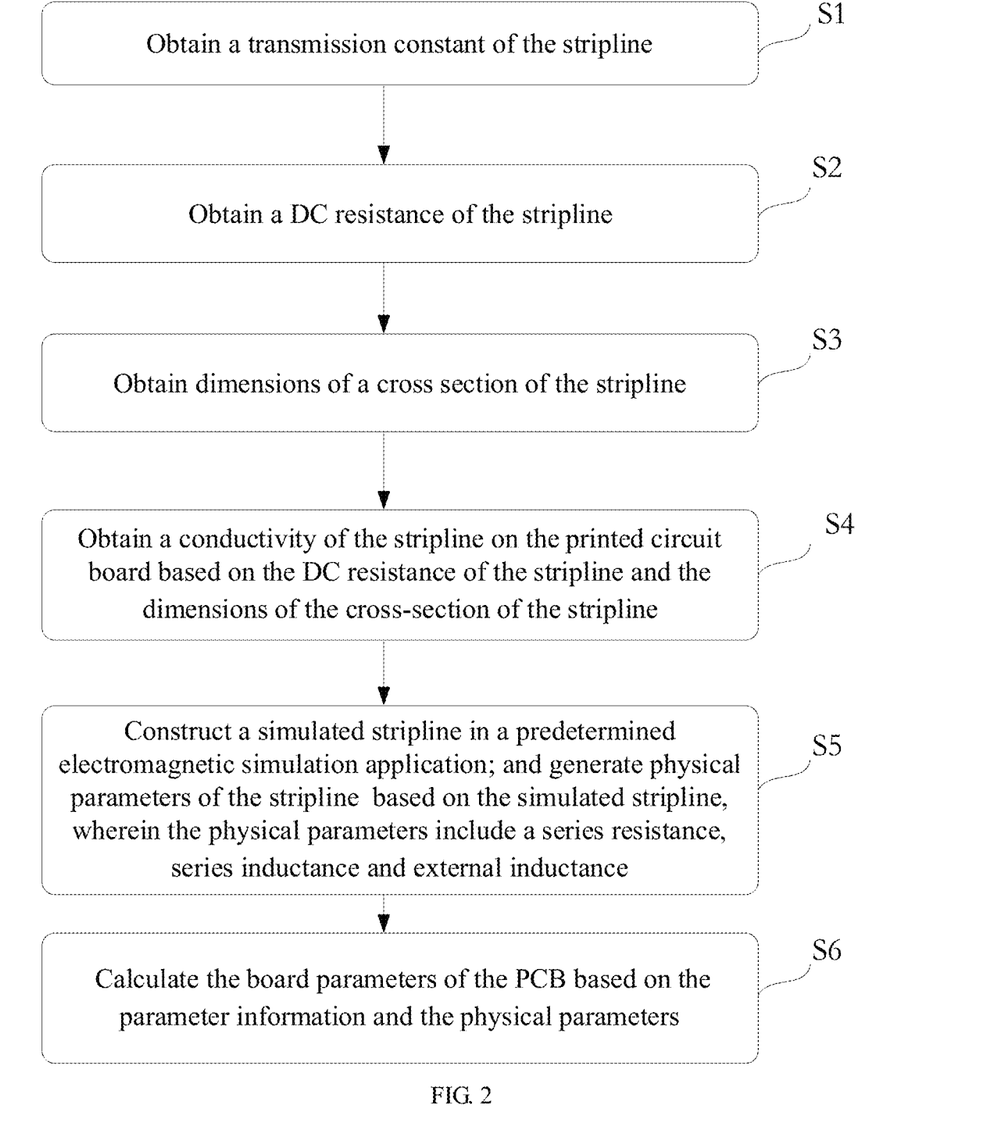
FIG. 2 shows a flowchart illustrating a method of obtaining board parameters of a printed circuit board according to one embodiment of the present disclosure.

FIG. 2 shows an exemplary sequence of operations of obtaining the parameter information of the stripline according to one embodiment of the present disclosure.

Step S1 is first executed, by which a transmission constant of the stripline is obtained.

Then step S2 is executed, by which a DC resistance of the stripline is obtained.

Then step S3 is executed, by which dimensions of a cross-section of the stripline are obtained.

Then step S4 is executed, by which conductivity of the stripline on the printed circuit board are obtained based on the DC resistance of the stripline and the dimensions of the cross-section of the stripline;

Then step S5 is executed, by which a simulated stripline is constructed in a predetermined electromagnetic simulation application, and physical parameters of the stripline are generated based on the simulated stripline, wherein the physical parameters include a series resistance, a series inductance and an external inductance; and Finally, step S6 is executed, by which the board parameters of the PCB are calculated based on the parameter information and the physical parameters.

In some embodiment, the physical parameters such as the series resistance, series inductance and external inductance of the stripline are obtained after obtaining the parameter information such as the transmission constant, DC resistance and cross-sectional dimensions of the stripline based on the physical nature of the stripline.

Figure 3:
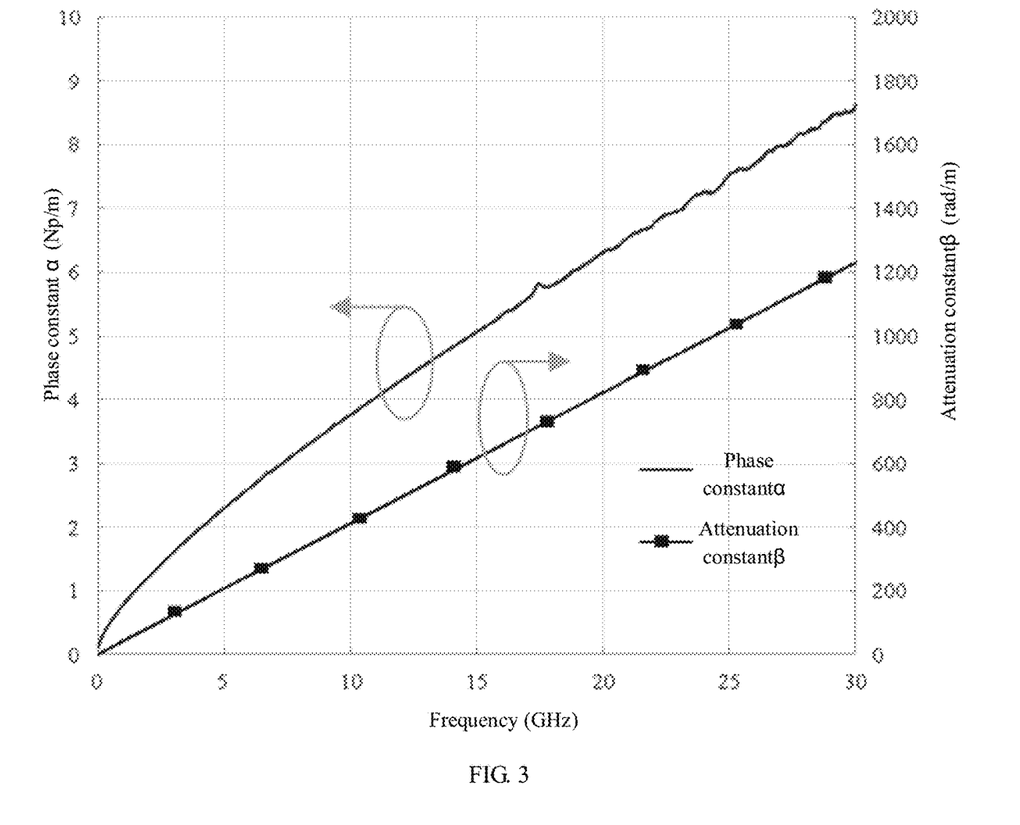
FIG. 3 is a graph showing a transmission constant of a stripline obtained in a method of obtaining board parameters of a printed circuit board according to one embodiment of the present disclosure.

In some embodiment, obtaining the transmission constant of the stripline based on the physical nature of the stripline may be performed by using a TRL method, or a delta-L method, etc. Among them, the delta-L method is a conventional method for loss testing, which is easy to operate, has a high accuracy, and can be de-embedded, whose principle is to design two striplines with different lengths, obtain S-parameters of the two striplines, and then obtain the transmission constant of the striplines through a matrix eigenvalue method. FIG. 3 is a graph showing transmission constants of a stripline obtained in a method of obtaining board parameters of a printed circuit board according to one embodiment of the present disclosure. The transmission constant shown in FIG. 3 corresponds to an exemplary stripline with a DC resistance of 45 ohms, and the transmission constant of the stripline is in the form of a complex number, $\gamma=\alpha+j\beta$, wherein $\alpha$ is an attenuation constant, and $\beta$ is a phase constant, and j is the imaginary number. The two arrows in FIG. 3 indicate which Y-axis the two lines correspond to respectively.

Figure 4:
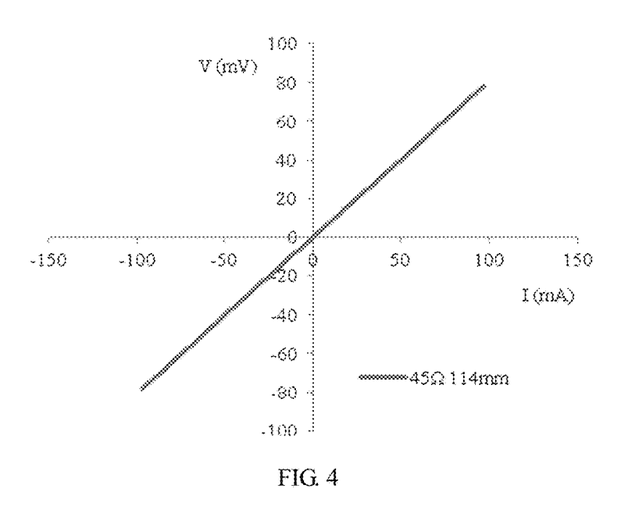
FIG. 4 is a V-I graph of a stripline with a DC resistance of 45 ohms according to one embodiment of the present disclosure.
Figure 5:
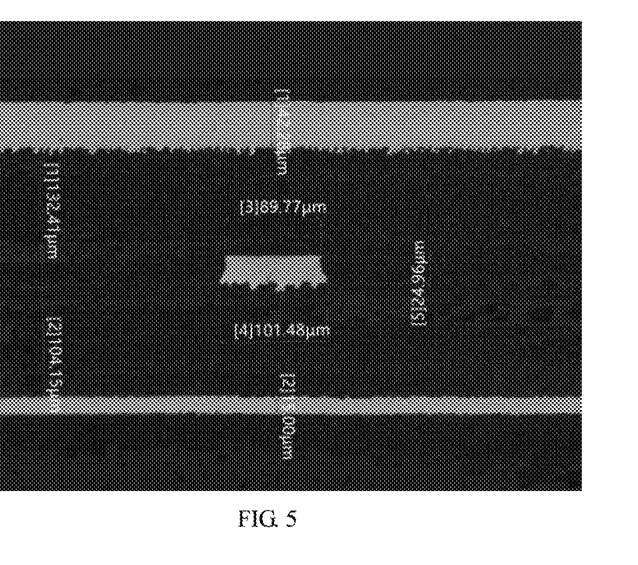
FIG. 5 shows dimensions of a cross-section of a stripline on a printed circuit board according to one embodiment of the present disclosure.

In one embodiment, when obtaining the DC resistance of the stripline and the dimensions of the cross-section of the stripline, the DC resistance of the stripline is measured by a resistance measurement equipment. FIG. 4 is a V-I graph of a stripline with a DC resistance of 45 ohms and a length of 114 mm according to one embodiment of the present disclosure. The slope of the curve in FIG. 4 is the DC resistance of the stripline. The dimensions of the cross-section of the stripline are obtained by a dimension testing equipment; for example, the dimensions of the cross-section of the stripline are obtained by first cutting the printed circuit board by the dimension testing equipment and then measuring the dimensions with a microscope, wherein the dimensions includes a width and a height of the cross-section. FIG. 5 shows an exemplary diagram of the dimensions of the cross-section of the stripline.

In one embodiment, the conductivity of the stripline is obtained based on the DC resistance and the dimensions of the stripline.

Specifically, the formula used to calculate the conductivity of the stripline is given by:

$$R_{dc} = \frac{1}{\sigma} \cdot \frac{l}{S},$$

wherein $R_{dc}$ is the DC resistance of the stripline, $\sigma$ is the conductivity of the stripline, l is the length of the stripline, and S is the area of the cross-section of stripline (obtained based on the dimensions of the cross-section).

After obtaining the parameter information such as the transmission constant, the conductivity, and the dimensions of the cross-section of the stripline, the method proceeds to step S120.

Step S120 includes: obtaining physical parameters of the stripline based on the parameter information of the stripline and a predetermined electromagnetic simulation application.

Specifically, in one embodiment, obtaining physical parameters of the stripline based on the parameter information of the stripline and a predetermined electromagnetic simulation application includes:

1) configuring an input angular frequency and transmission medium; wherein the input angular frequency is equal to the frequency used when testing to obtain the transmission constant of the stripline, and the transmission medium is preferably, but not limited to, air.

It should be noted that in one embodiment, since the transmission medium is air, and the relative dielectric constant of air is 1, if another transmission medium is used, the formula $$L_{ext} = \frac{\mu_0 \varepsilon_0}{C}$$

for calculating the external inductance of the stripline needs to be multiplied by the relative dielectric constant A of that transmission medium, i.e., $$L_{ext} = A\frac{\mu_0 \varepsilon_0}{C}.$$

2) constructing a simulated stripline in the predetermined electromagnetic simulation application based on the dimensions of the cross-section of the stripline, a conductivity of the stripline, the input angular frequency, and the transmission medium. Unless stated otherwise, herein the "simulated stripline" refers to the stripline simulated in the electromagnetic simulation application and the "stripline" used alone refers to the actual stripline on the printed circuit board.

The predetermined electromagnetic simulation application includes, but is not limited to, electromagnetic simulation software such as ADS, HFSS, etc., and the process of constructing the simulated stripline in the predetermined electromagnetic simulation application includes: constructing the simulated stripline in the predetermined electromagnetic simulation application, wherein the conductivity of the metal material adopted by the simulated stripline is the conductivity of the stripline on the printed circuit board obtained in step S110, and dimensions of a cross-section of the simulated stripline is the dimensions of the cross-section of the stripline on the printed circuit board obtained in step S110.

In other words, in the predetermined electromagnetic simulation application, the conductivity of the stripline, and the dimensions of the cross-section of the stripline obtained in step S110 are used to construct the simulated stripline, based on a set frequency using air as the transmission medium, to obtain an RLGC file of the simulated stripline, which includes the physical parameters of the simulated stripline, wherein the RLGC file characterizes the stripline through an RLGC matrix.

3) generating the physical parameters including a series resistance, a series inductance, and an external inductance of the stripline based on the simulated stripline.

Specifically, in one embodiment, the series resistance of the stripline is a series resistance generated in the above predetermined electromagnetic simulation application, the series inductance is a series inductance generated in the above predetermined electromagnetic simulation application, and the external inductance is an external inductance generated in the above predetermined electromagnetic simulation application.

The external inductance of the stripline is calculated from a simulated capacitance C of a simulated stripline in the predetermined electromagnetic simulation application, according to the following formula:

$$L_{ext} = \frac{\mu_0 \varepsilon_0}{C},$$

wherein $L_{ext}$ is the external inductance, C is the simulated capacitance, is the vacuum magnetic permeability, and $\varepsilon_0$ is the vacuum conductivity. It should be noted that in one embodiment, since the transmission medium is air, and the relative dielectric constant of air is 1, if another transmission medium is used, the above formula needs to be multiplied by the relative dielectric constant A of that transmission medium, i.e., $$L_{ext} = \frac{\mu_0 \varepsilon_0}{C}A.$$

Figure 6:
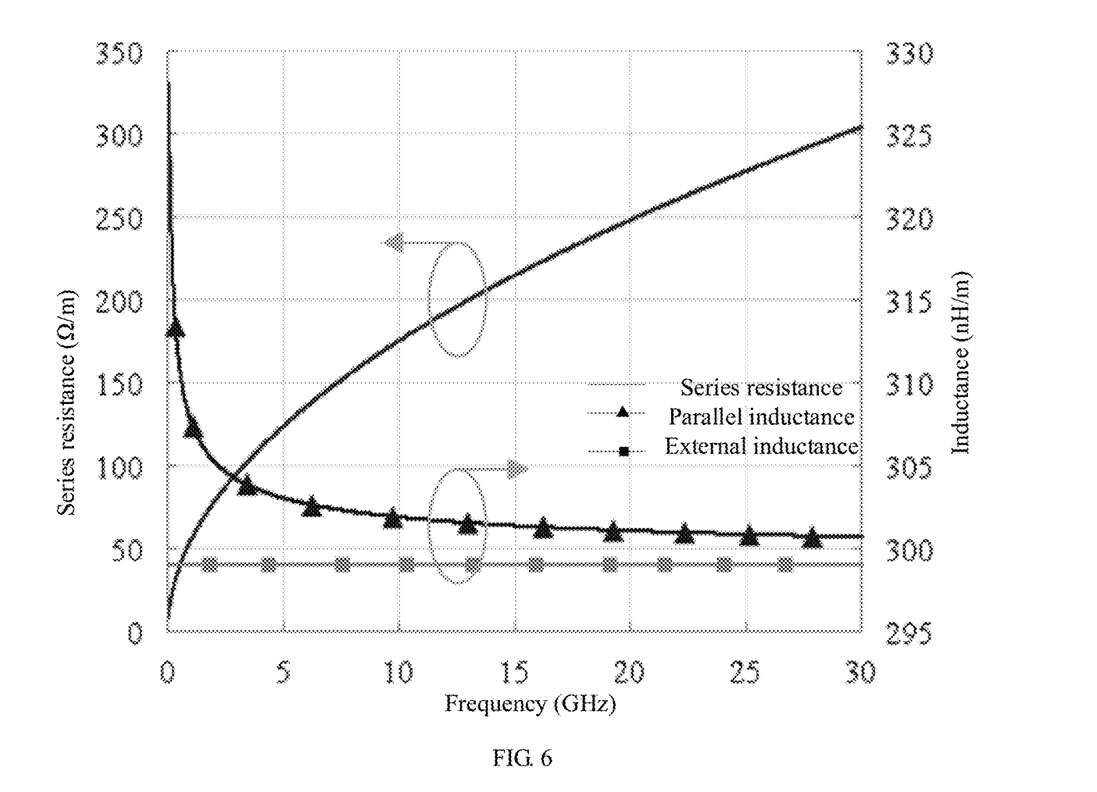
FIG. 6 is a graph showing physical parameters of a stripline varying with frequencies according to one embodiment of the present disclosure.

FIG. 6 is a graph showing physical parameters of a stripline varying with frequencies, according to one embodiment of the present disclosure. Specifically, FIG. 6 shows three physical parameters, including the series resistance R, the series inductance L and the external inductance $L_{ext}$ of the stripline, which are obtained in the electromagnetic simulation application ADS. The arrows in FIG. 6 indicate which Y-axis the three lines correspond to respectively.

Step S130, calculating the board parameters of the printed circuit board based on the parameter information and the physical parameters of the stripline.

Specifically, in one embodiment, calculating the board parameters of the printed circuit board based on the parameter information and the physical parameters of the stripline includes:

1) obtaining a first parameter and a second parameter of the board parameters of the printed circuit board based on the transmission constant, the series resistance, the series inductance of the stripline calculated by means of a first calculation formula; and
2) calculating the board parameters of the printed circuit board based on the first parameter, the second parameter, and the external inductance.

The first calculation formula is given by:

$$G + j\omega C = \frac{\gamma^2}{R + j\omega L},$$

wherein $\gamma$ is the transmission constant of the stripline and is a complex number, R is the series resistance, L is the series inductance, G is the first parameter, with the first parameter being a parallel conductance, C is the second parameter, with the second parameter being a parallel capacitance, j is the imaginary part, and $\omega$ is the input angular frequency. The input angular frequency $\omega$ is equal to the frequency used when testing to obtain the transmission constant of the stripline.

In the first calculation equation, since every parameter in $$\frac{\gamma^2}{R + j\omega L}$$

is known, the corresponding parallel conductance G and parallel capacitance C of G+j$\omega$C can be obtained based on the corresponding calculation of the imaginary and real parts of the complex number $\gamma$.

Figure 7:
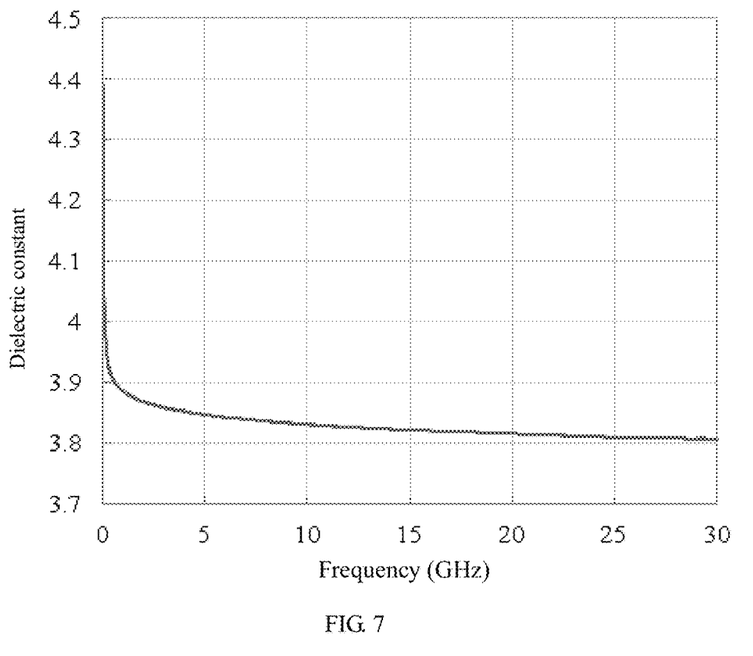
FIG. 7 is a graph showing a relative dielectric constant of a printed circuit board varying with frequencies according to one embodiment of the present disclosure.
Figure 8:
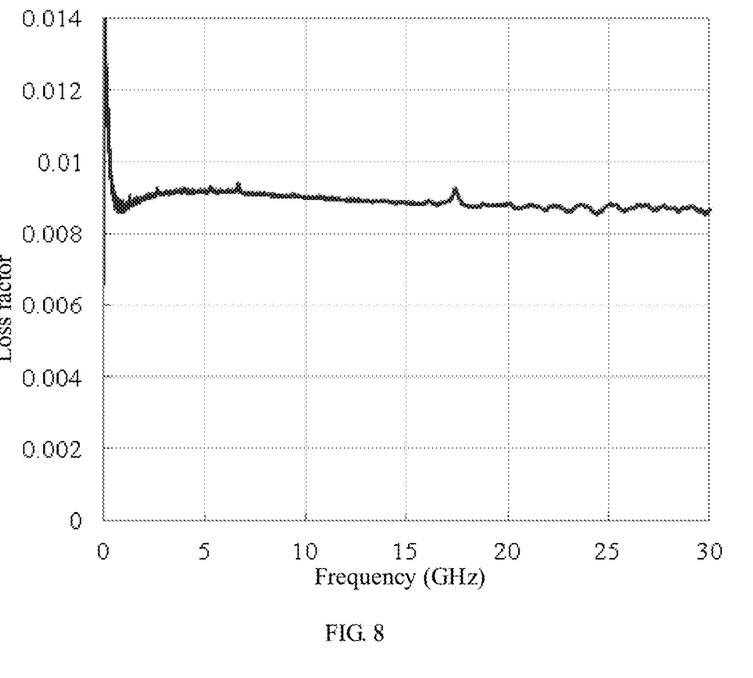
FIG. 8 is a graph showing a loss factor of a stripline varying with frequencies according to one embodiment of the present disclosure.

Calculating the board parameters of the printed circuit board based on the first parameter, the second parameter, and the external inductance further includes:

when the board parameters of the printed circuit board includes a relative dielectric constant Dk, the relative dielectric constant is calculated by the following formula:

$$Dk = \frac{L_{ext}C}{\mu_0 \varepsilon_0};$$

wherein Dk is the relative dielectric constant, $L_{ext}$ is the external inductance, C is the second parameter, with the second parameter being the parallel capacitance, $\mu_0$ is the vacuum magnetic permeability, and $\varepsilon_0$ is the vacuum conductivity. FIG. 7 is a graph showing a relative dielectric constant of a printed circuit board varying with frequencies, according to one embodiment of the present disclosure.

when the board parameters of the printed circuit board comprises a loss factor, the loss factor is given by:

$$Df = \frac{G}{\omega C},$$

wherein Df is the loss factor, G is the first parameter, the first parameter is the parallel conductance, C is the second parameter, the second parameter is the parallel capacitance, and $\omega$ is the input angular frequency. FIG. 8 is a graph showing a loss factor of a stripline varying with frequencies according to one embodiment of the present disclosure.

So the method utilizes the physical nature of the stripline, to obtain the relative dielectric constant Dk and loss factor Df of the printed circuit board. It is simple and effective. There is no need for fitting or adopting a hypothetical model in order to obtain the relative dielectric constant Dk and loss factor Df corresponding to each frequency point of the stripline.

In summary, in the present disclosure, the physical parameters of the stripline are obtained based on the physical nature of the stripline on the printed circuit board, and there is no need for fitting or adopting a hypothetical model in order to obtain board parameters corresponding to each frequency point of the stripline; the present disclosure is simple and straightforward during operation, and the obtained board parameters of the printed circuit board are highly accurate. Therefore, the present disclosure effectively overcomes shortcomings in the prior art and has a high industrial value.

The above embodiments are only illustrative of the principles of the present disclosure and its effectiveness, and are not intended to limit the scope of the present disclosure. Any person skilled in the art may modify or change the above embodiments without violating the spirit and scope of the present disclosure. Therefore, all equivalent modifications or changes made by a person having ordinary knowledge in the art, without departing from the spirit and technical ideas disclosed in the present disclosure, shall still be covered by the attached claims of the present disclosure.

What is claimed is:

1. A method for obtaining board parameters of a printed circuit board, wherein the method comprises:
   obtaining parameter information of a stripline on the printed circuit board;
   obtaining physical parameters of the stripline based on the parameter information of the stripline and a predetermined electromagnetic simulation application, wherein the obtaining of the physical parameters further comprises:
   configuring an input angular frequency and transmission medium;
   constructing a simulated stripline in the predetermined electromagnetic simulation application based on the dimensions of the cross-section of the stripline, a conductivity of the stripline, the input angular frequency, and the transmission medium; and
   generating the physical parameters including a series resistance, a series inductance, and an external inductance of the stripline based on the simulated stripline; and
   calculating the board parameters of the printed circuit board based on the parameter information and the physical parameters of the stripline.

2. The method for obtaining board parameters of a printed circuit board according to claim 1, wherein obtaining the parameter information of the stripline comprises: obtaining a transmission constant of the stripline.

3. The method for obtaining board parameters of a printed circuit board according to claim 1, wherein obtaining the parameter information of the stripline comprises:
obtaining a DC resistance of the stripline, and
obtaining dimensions of a cross-section of the stripline.

4. The method for obtaining board parameters of a printed circuit board according to claim 3, wherein obtaining the parameter information of the stripline further comprises:
obtaining electrical conductivity of the stripline based on the DC resistance of the stripline and the dimensions of the cross-section of the stripline.

5. The method for obtaining board parameters of a printed circuit board according to claim 1, wherein the transmission medium is air.

6. The method for obtaining board parameters of a printed circuit board according to claim 1, wherein calculating the board parameters of the printed circuit board based on the parameter information and the physical parameters of the stripline comprises:
obtaining a first parameter and a second parameter of the board parameters of the printed circuit board based on the transmission constant, the series resistance, the series inductance of the stripline calculated by means of a first calculation formula; and
calculating the board parameters of the printed circuit board based on the first parameter, the second parameter, and the external inductance.

7. The method for obtaining board parameters of a printed circuit board according to claim 6, wherein the first calculation formula is given by:

$$G + j\omega C = \frac{\gamma^2}{R + j\omega L};$$

wherein $\gamma$ is the transmission constant of the stripline and is a complex number, R is the series resistance, L is the series inductance, G is the first parameter, the first parameter is a parallel conductance, C is the second parameter, the second parameter is a parallel capacitance, j is the imaginary part, and $\omega$ is the input angular frequency.

8. The method for obtaining board parameters of a printed circuit board according to claim 7, wherein the board parameters of the printed circuit board comprise a relative dielectric constant, and the relative dielectric constant is calculated by the following formula:

$$Dk = \frac{L_{ext}C}{\mu_0 \varepsilon_0};$$

wherein Dk is the relative dielectric constant, $L_{ext}$ is the external inductance, C is the second parameter, with the second parameter being the parallel capacitance, $\mu_0$ is the vacuum magnetic permeability, and $\varepsilon_0$ is the vacuum conductivity.

9. The method for obtaining board parameters of a printed circuit board according to claim 7, wherein the board parameters of the printed circuit board comprise a loss factor, and the loss factor is given by:

$$Df = \frac{G}{\omega C};$$

wherein Df is the loss factor, G is the first parameter, with the first parameter being the parallel conductance, C is the second parameter, with the second parameter being the parallel capacitance, and $\omega$ is the input angular frequency.

* * * * *